United States Patent [19]
Hoadley

[11] Patent Number: 5,441,073
[45] Date of Patent: Aug. 15, 1995

[54] APPARATUS FOR CONTROLLED RELEASE OF AN ERODIBLE SOLID INTO A LIQUID

[76] Inventor: Francis B. Hoadley, Rte. 1 Box 166A, Lamont, Fla. 32336

[21] Appl. No.: 206,530

[22] Filed: Mar. 7, 1994

[51] Int. Cl.⁶ .............................................. B01D 11/02
[52] U.S. Cl. .................................. 137/268; 422/264; 239/310
[58] Field of Search ............... 137/268; 422/264, 282, 422/281; 239/310

[56] References Cited

U.S. PATENT DOCUMENTS

| | | | |
|---|---|---|---|
| 2,589,595 | 3/1952 | Aske | 137/268 X |
| 2,758,877 | 8/1956 | Gleason | 422/282 X |
| 3,929,151 | 12/1975 | Rubin | 137/268 |
| 4,249,562 | 2/1981 | King, Sr. | 137/268 |
| 4,270,565 | 6/1981 | King, Sr. | 137/268 |
| 4,331,174 | 5/1982 | King, Sr. | 137/268 |
| 4,662,387 | 5/1987 | King, Sr. | 137/268 |
| 5,076,315 | 12/1991 | King | 137/268 |
| 5,259,409 | 11/1993 | Cervola | 137/268 |

*Primary Examiner*—Martin P. Schwadron
*Assistant Examiner*—Kevin L. Lee
*Attorney, Agent, or Firm*—Carnes, Cona, Dixon

[57] ABSTRACT

A dispenser assembly provides for a hydro-injected venturi release of an erodible solid into a liquid. This dispenser assembly regulates the flow of a fluid direction and pressure through an activation chamber which contains a chemical capsule, and provides adequate levels of solution concentration. The dispenser assembly consists of a lower body member, an upper body member which contains the activation chamber, and an hydro-injector venturi assembly. The hydro-injector venturi assembly controls the rate of pressure of a fluid entering the upper body member into the activation chamber as well as the flow out of the chamber by means of a venturi plate.

18 Claims, 7 Drawing Sheets

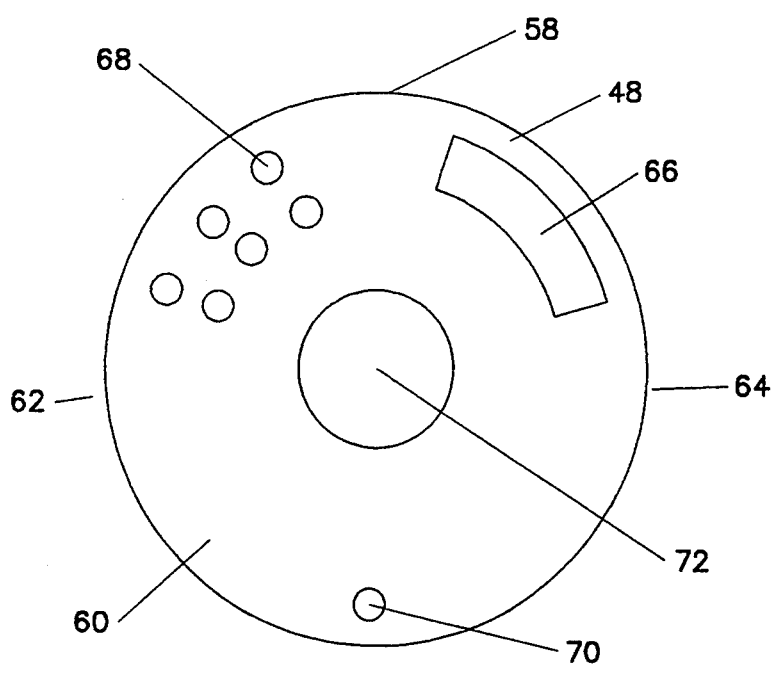
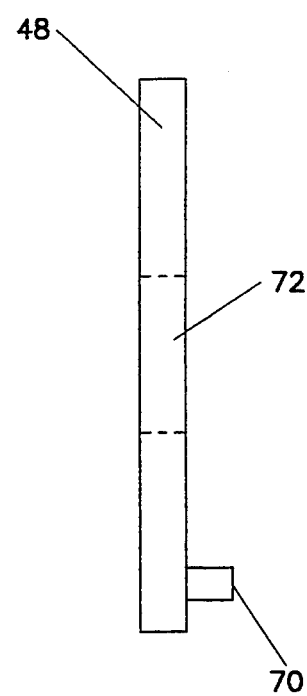
Fig.5a
Fig.7
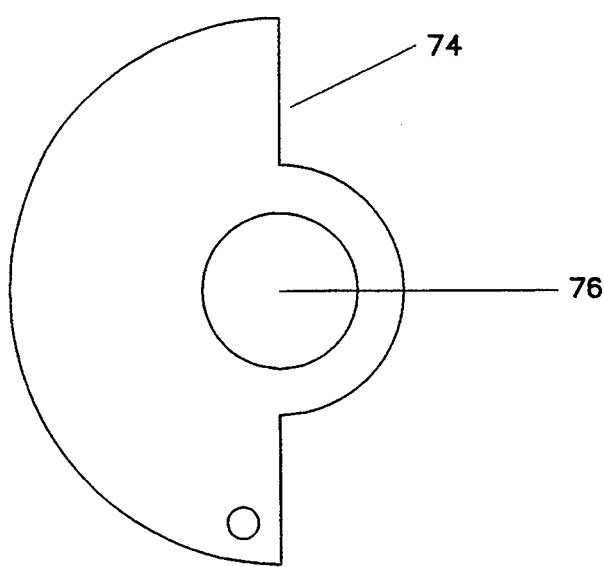
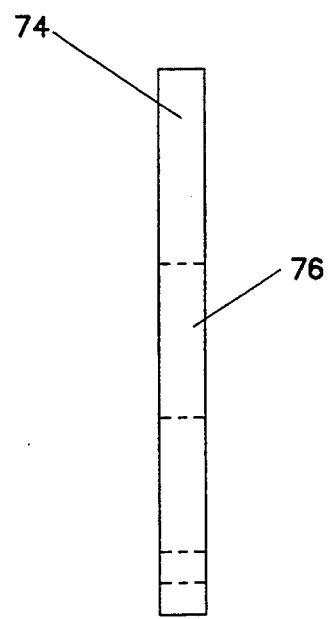
Fig.5b
Fig.8

APPARATUS FOR CONTROLLED RELEASE OF AN ERODIBLE SOLID INTO A LIQUID

BACKGROUND OF THE INVENTION

1. Field of the Invention

This invention relates generally to a dispensing assembly and, more specifically, to a dispensing assembly that controllably releases an erodible solid into a liquid.

2. Description of the Prior Art

The use of dispensing assemblies is well known in the art. However, the dispensing assemblies that are commercially available tend to be expensive, difficult to operate, and do not provide user variable levels of solution concentration. For example, U.S. Pat. No. 4,270,565 issued to King, Sr., discloses a dispenser assembly that places a chemical capsule in a housing. Within the housing is a spring. Once a cap is placed on the housing, it causes the spring to compress and thereby force the chemical capsule into direct contact with the fluid path. Such an arrangement does not permit concentration control.

There is a need in the art for a dispenser assembly that is inexpensive to fabricate and provides for various levels of solution concentration selectable by the user.

SUMMARY OF THE INVENTION

The present invention comprises a dispenser assembly that provides for a controlled release of an erodible solid into a liquid. The dispenser assembly of the present invention consists of a lower body member, an upper body member, and a hydro-injector venturi system.

The lower body is cylindrical and includes an inlet for receiving a fluid line and an outlet for receiving a second fluid line. A hydro chamber is located between the inlet and the outlet.

The upper body is cylindrical and is securely attached to the lower body. This upper body receives and maintains a solid erodible chemical capsule. When the dispenser is not in use, fluid drains from the upper chamber thereby terminating further capsule erosion.

The hydro-injector venturi system extends from the lower body member into the upper body member. This hydro-injector venturi system allows a user to change the concentration of solution exiting the outlet. Several different methods are available to effect this change.

Therefore, it is an object of the present invention to provide for a dispenser assembly that will release different solution concentration levels, as selected by the user.

It is another object of the present invention to provide for a dispenser assembly that is easy to use and operate.

It is another object of the present invention to provide for a dispenser assembly that is inexpensive to fabricate and durable in operation.

It is a final object of the present invention to provide for a dispenser assembly that allows for a chemical cartridge to dry out between uses and be reused at a later time. This permits total chemical dispersion and reduces the need for disposal of hazardous chemicals.

BRIEF DESCRIPTION OF THE DRAWINGS

FIG. 5A is a top planar view of the first embodiment of the venturi plate used in the hydro-injector venturi system of the dispenser assembly of the present invention.

FIG. 5B is a top planar view of the venturi plate cam used with the hydro-injector venturi plate illustrated in FIG. 5A.

FIG. 7 is a side view of the first embodiment of the venturi plate used in the hydro-injector venturi system of the dispenser assembly of the present invention.

FIG. 8 is a side view of the of the venturi plate cam used with the hydro-injector venturi plate illustrated in FIG. 5A.

Similar reference numerals refer to similar parts throughout the several views of the drawings.

DESCRIPTION OF THE PREFERRED EMBODIMENTS

Figure 1:
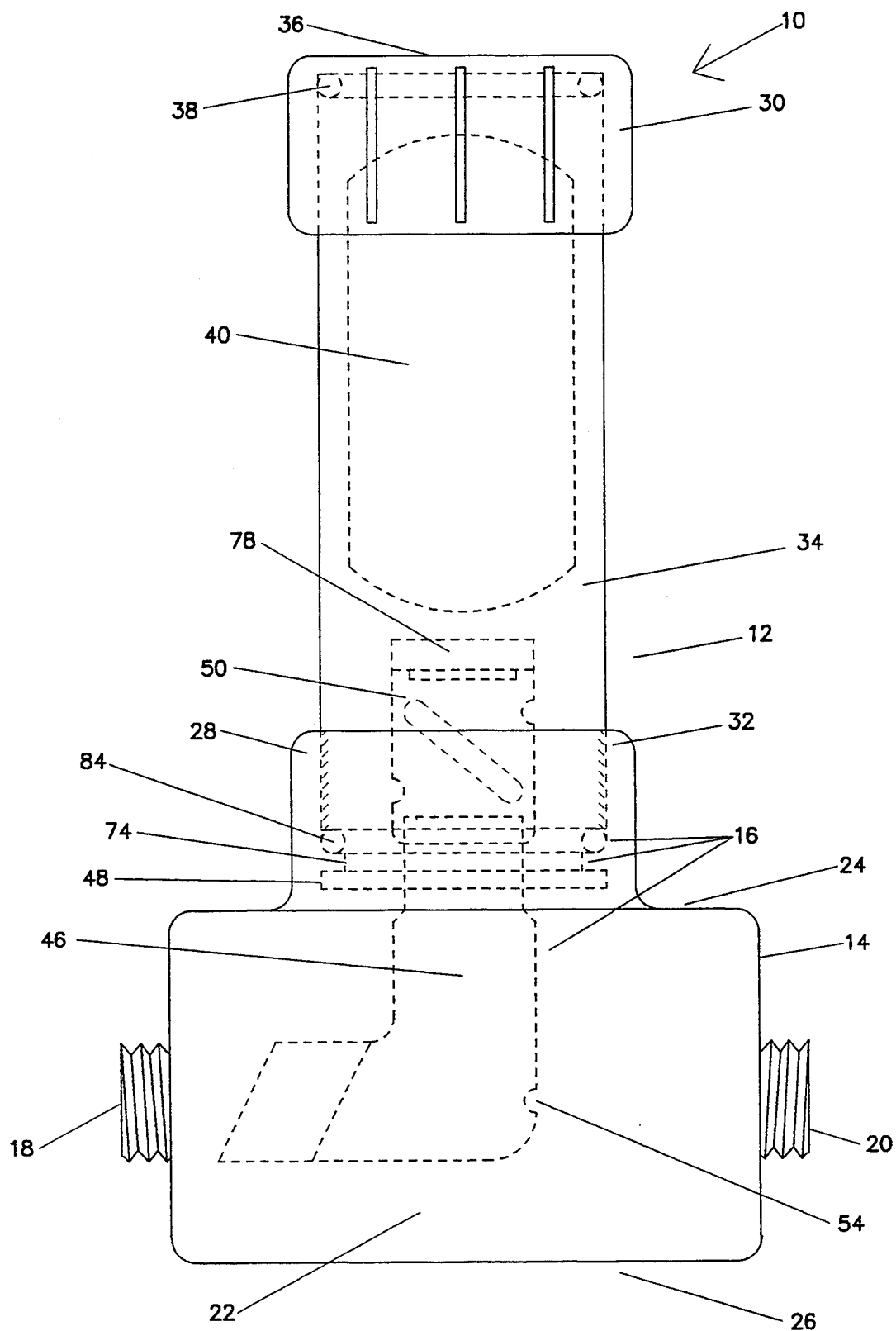
FIG. 1 is a partial sectional side view of dispenser assembly of the present invention.

As illustrated in FIG. 1, the dispenser assembly 10 consists of an upper body member 12, a lower body member 14, and a hydro-injector venturi system 16. This figure shows one variation of a hydro-injector venturi system that can be utilized with the dispenser assembly of the present invention.

The lower body member further includes an inlet 18, an outlet 20, and a hydro chamber 22. The inlet and the outlet can each be threaded. The inlet is attachable to and removable from a pressurized fluid line. The outlet is attachable to and removable from a second fluid line.

The lower body member also includes an upper surface 24 and a bottom surface 26. Centrally located and extending outwardly on the upper surface of the lower body member is a cylindrical receiving member 28 which receives the upper body member. An O-ring 84 is located within the cylindrical receiving member and contacts the upper body member. The O-ring prevents leakage when the upper body member is attached to the lower body member.

The cylindrical receiving member can be threaded to provide for the upper body member of the dispenser assembly to be easily attached and removed. The inlet, outlet, hydro chamber, and cylindrical receiving member of the lower body member are integral.

The upper body member 12 includes a top portion 30, a bottom portion 32, and an activation chamber 34. Located on the top portion is a cap 36. This cap is attachable to and removable from the upper body. Removal of the cap allows for the insertion of the chemical capsule 40 (such as fertilizer or chlorine) into the activation chamber. An O-ring seal 38 is located inside the cap in order to prevent fluid from leaking from the upper body member. The bottom portion of the upper body member can be permanently attached to the lower body member or, as illustrated in this figure, can be attachable and removable to and from the cylindrical receiving member 28 of the lower body member 14.

The hydro-injector venturi system 16 is located within the cylindrical receiving member and extends from the hydro chamber of the lower body member into the upper body member.

Figure 2A:
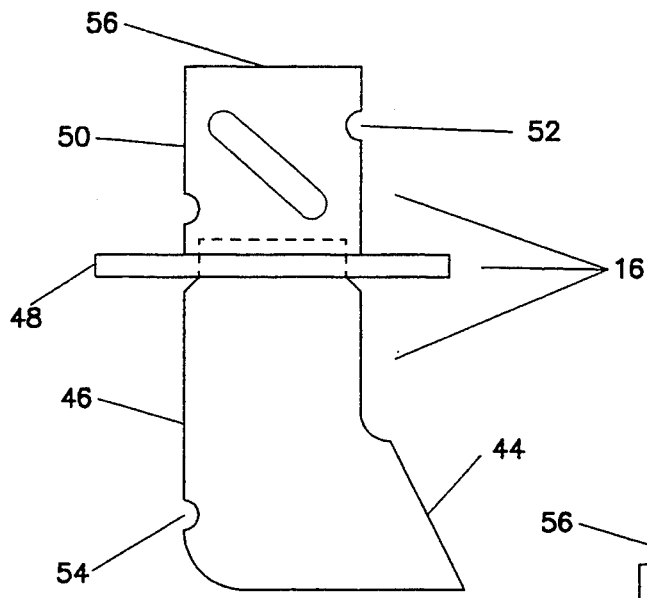
FIG. 2A is a side view of one example of a hydro-injector venturi system that can be used in the dispenser assembly of the present invention.
Figure 2B:
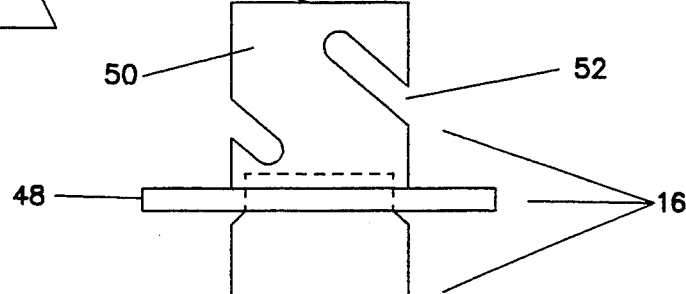
FIG. 2B is a frontal view of the hydro-injector venturi system illustrated in FIG. 2A.
Figure 2C:
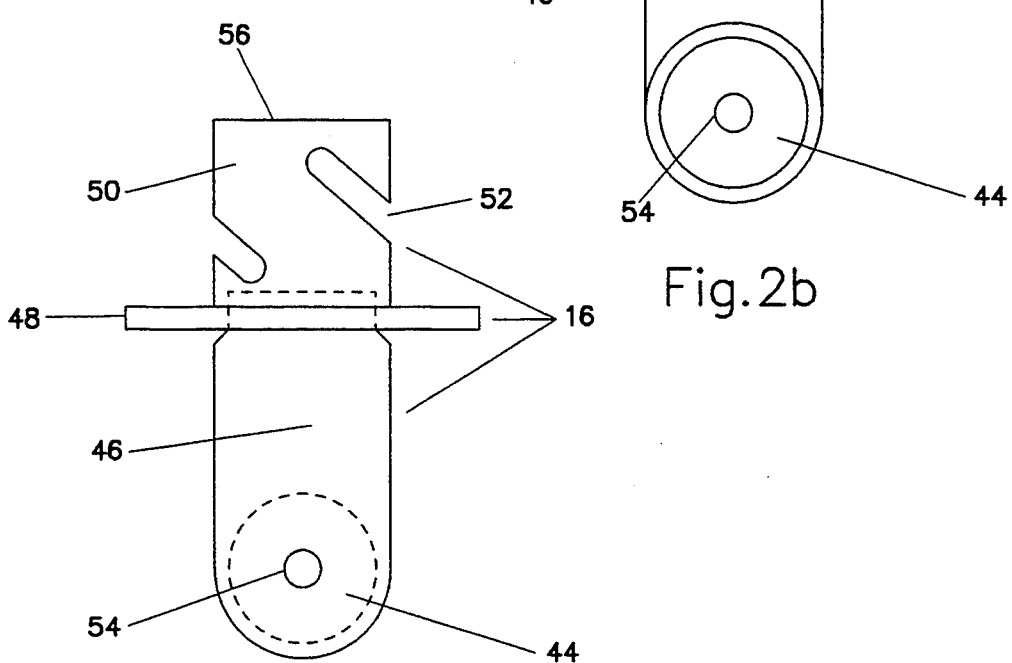
FIG. 2C is a back view of the hydro-injector venturi system illustrated in FIG. 2A.

FIGS. 2A, 2B, and 2C illustrate an example of the hydro-injector venturi system used in the dispenser assembly. The hydro-injector venturi system consists of several components. A hydro-injector body 46 has an L-shape configuration. This hydro-injector body also includes an opening which forms an inlet 44. The inlet of the hydro-injector body faces the inlet of the lower body member. Located at the bottom (the elbow) of the hydro-injector body 46, and facing the outlet of the lower body member is a regulating hole 54. Impaled to the top of the hydro-injector body is a venturi plate 48.

The top of the hydro-injector body and its impaled venturi plate are located within the upper body member. The outer periphery of the venturi plate communicates with the side wall of the upper body member.

A swirler 50 is threadably attachable to and removable from the hydro-injector body. The venturi plate is located between the top of the hydro-injector body and the swirler. The swirler maintains the chemical capsule in a fixed position. The swirler includes an open top and one or more flow holes 52. These flow holes are generally in the shape of diagonally disposed ellipses but can take on any shape as desired.

Figure 6A:
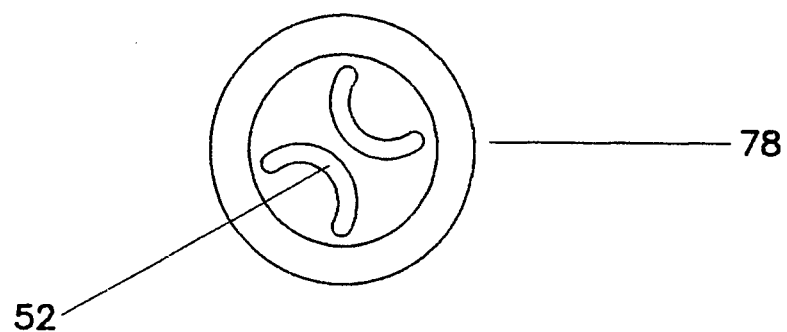
FIG. 6A is a top planar view of a hydro-injector coupler swirler cap used in the hydro-injector venturi system of the dispenser assembly of the present invention.
Figure 6B:
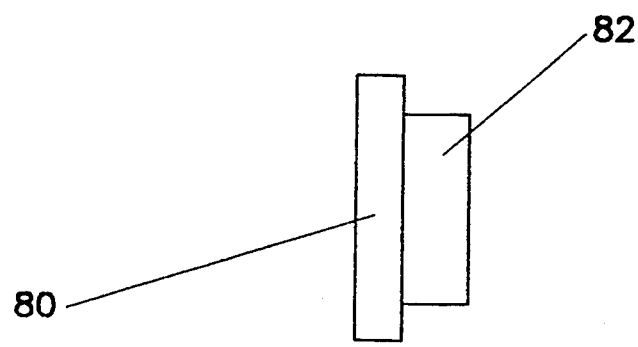
FIG. 6B is a side view of a hydro-injector coupler swirler cap used in the hydro-injector venturi system of the dispenser assembly of the present invention.

A hydro-injector coupler swirler cap 78 can be attached to the open top of the swirler 50. This cap is illustrated in further detail in FIGS. 6a and 6b. The cap includes a top 80 and a bottom 82. The cap's top has a larger diameter than that of the cap's bottom and also a larger diameter than that of the open top of the swirler. The bottom of the cap is received in the open top of the swirler with the cap's top preventing the cap from falling into the swirler. The cap's top may include one or more of flow holes 52. The hydro-injector coupler swirler cap 78 can either be attachable to and removable from the swirler or the cap can be permanently attached to the swirler.

FIGS. 5A, 5B, 7, and 8 illustrate the first embodiment of the venturi plate and cam. As seen in these figures, the venturi plate 48 has an upper area 58 and a lower area 60. The venturi plate also includes a left side 62 and a right side 64. Located on the upper area on the right side of the venturi plate is a large hole 66. Located on the upper area on the left side of the venturi plate is a plurality of holes 68.

A cam 74 is located on the venturi plate. This cam has a semi-circular shape and can freely rotate about the hydro-injector body (not illustrated) in order to either cover or expose the plurality of holes or the large hole as desired.

Centrally located in the venturi plate is a first aperture. A second aperture is located in the cam. This second aperture is aligned with the first aperture. These apertures receive the hydro-injector body.

Figure 5C:
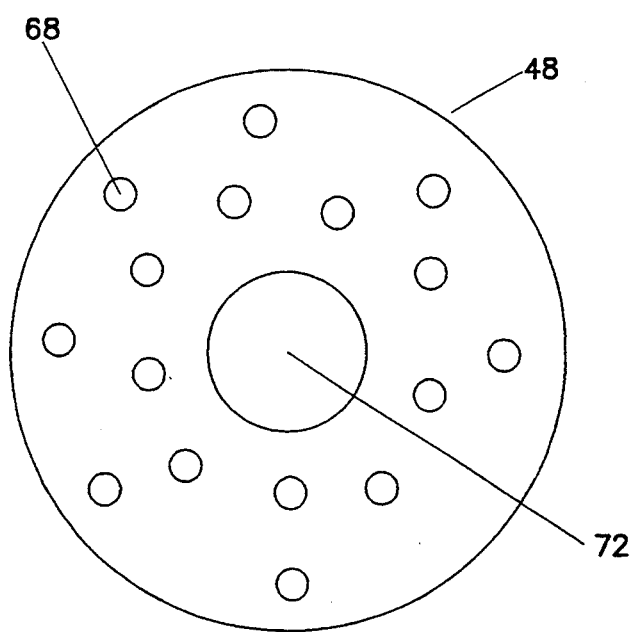
FIG. 5C is a top planar view of the second embodiment of the venturi plate used in the hydro-injector venturi system of the dispenser assembly of the present invention.
Figure 9:
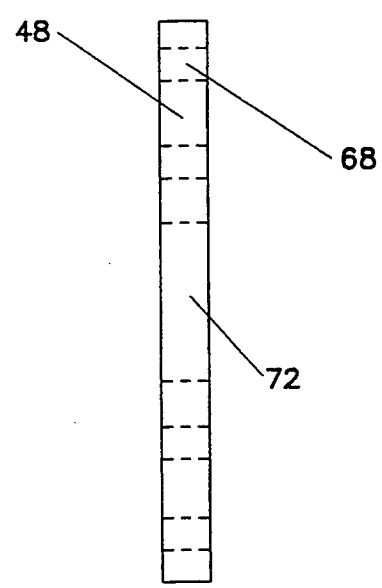
FIG. 9 is a side view of the second embodiment of the venturi plate used in the hydro-injector venturi system of the dispenser assembly of the present invention.

A second embodiment of the venturi plate is illustrated in FIG. 5C and 9. As seen in these figures, the venturi plate has a centrally located first aperture 72. This first aperture receives the hydro-venturi body. The venturi plate's surface includes a plurality of holes 68. The cam illustrated in FIGS. 5B and 8 may also be used with this venturi plate.

In order to utilize the present invention, a fluid line is attached to the lower body member inlet. This fluid line will deliver pressurized fluid into the dispenser assembly. A second fluid line is attached to the lower body member outlet. This fluid line will deliver the fluid, now in solution with the chemical placed into the dispenser assembly, to its ultimate destination.

Once the fluid enters the lower body member inlet, the fluid will flow into as well as around the hydro-injector body in the hydro chamber. The fluid entering the inlet of the hydro-injector body is routed into the swirler. The fluid so routed, flows through the flow holes and the open top of the swirler (or through the flow holes of the hydro-injector coupler swirler cap if attached) into the activation chamber of the upper body member. Due to their unique elliptical shape, the flow holes cause fluid exiting through them to enter the activation chamber in a swirling manner.

Once the fluid is in the activation chamber, the swirling interaction of the fluid with the chemical capsule causes the capsule to erode. This forces the capsule's chemical into solution with the fluid. This solution exits the upper body member through the hole or holes in the venturi plate. Thereafter, the solution exits the dispenser through the lower body member outlet.

Figure 3A:
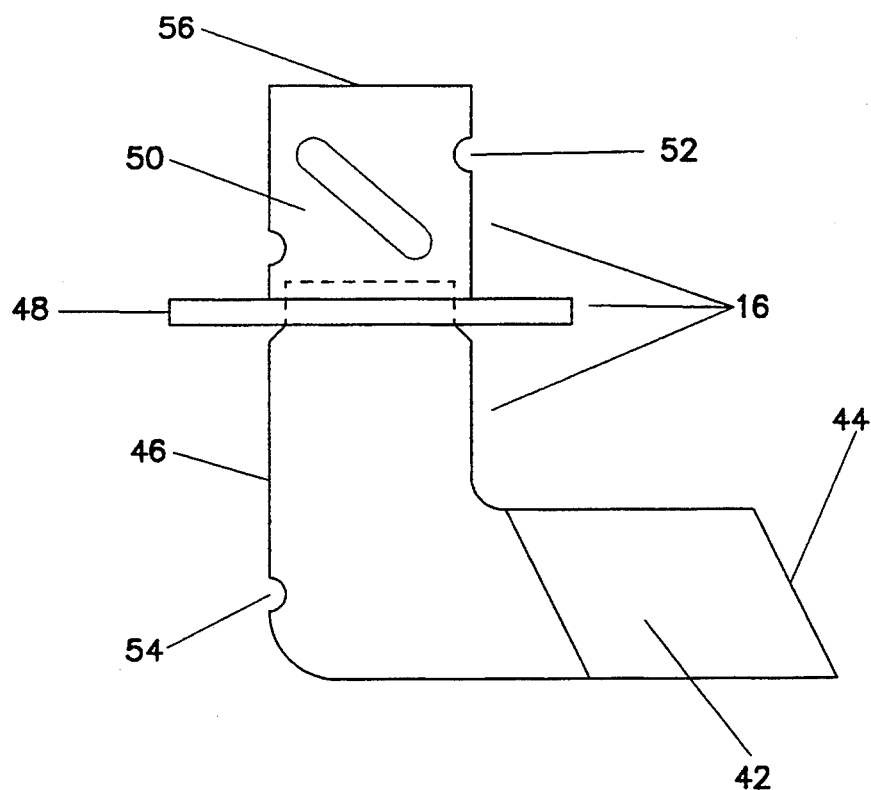
FIG. 3A is a side view of a second example of a hydro-injector venturi system that can be used in the dispenser assembly of the present invention.
Figure 3B:
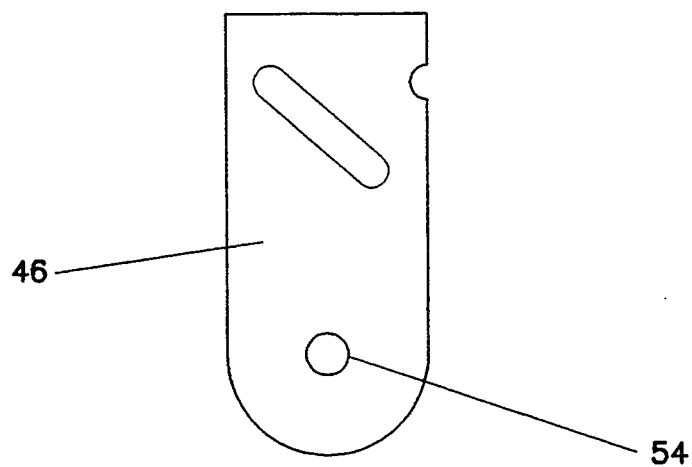
FIG. 3B is a back view of the hydro-injector venturi system illustrated in FIG. 3A.

The concentration of chemical in solution can be changed in a variety of ways. A hydro-injector tube 42 can be attached to the inlet 44 of the hydro-injector body (illustrated in FIG. 3A). This decreases the distance traveled by the fluid between introduction into the hydro chamber and entry into the hydro-injector body. This reduces the amount of fluid fan out in the hydro chamber and causes more of the fluid to flow into as opposed to around the hydro-injector. This increases the flow pressure of the fluid entering the activation chamber thereby causing a greater rate of erosion of the chemical capsule and thus a higher concentration of chemical in solution.

Figure 4:
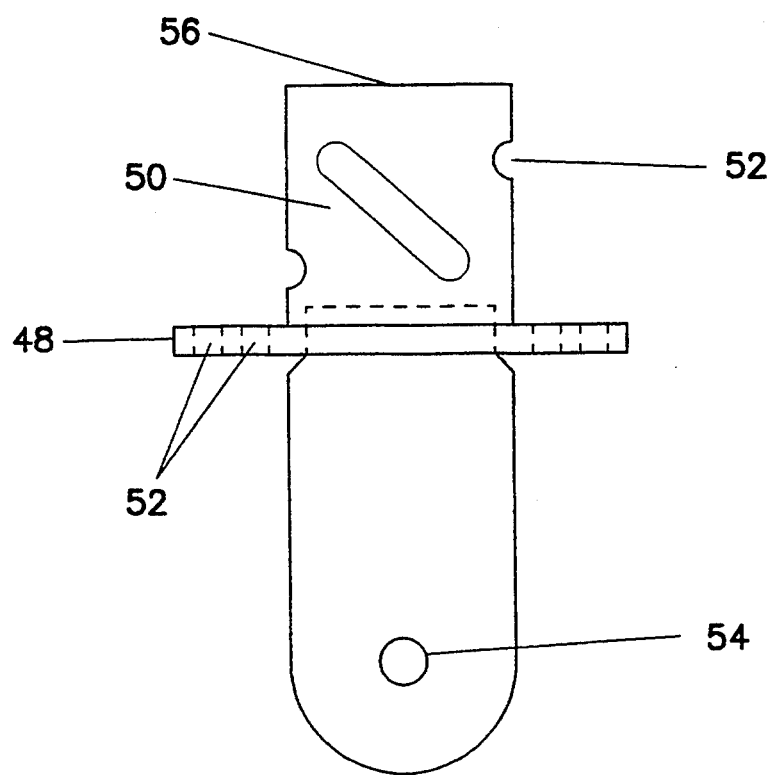
FIG. 4 is a front view of a third example of the hydro-injector venturi system that can be use in the dispenser assembly of the present invention.

Another method of chemical concentration control is to replace the hydro-injector body inlet 44, with a series of small holes 52. This structure is illustrated in FIG. 4. This structure will restrict the amount of fluid entering the hydro-injector body, and thus the activation chamber. As less fluid enters the activation chamber, less chemical erosion will occur, and a lower chemical concentration in solution will occur.

Another method of chemical concentration control is to change the size of the regulating hole. Increasing the size of the regulating hole, permits some fluid entering the hydro-injector to escape being routed to the activation chamber. This causes less fluid to enter the activation chamber.

Alternating the size of the regulating hole also causes an alteration in the volume and pressure for the fluid stream to flow out of the regulating hole toward the lower body member outlet. This alteration of the fluid stream will cause a partial vacuum, through a fluid venturi action, to result within the hydro chamber. In an attempt to reach pressure equilibrium, the partial vacuum will suck fluid out of the activation chamber at an increased rate.

A further method of chemical concentration control is to change the size, number, shape, and configuration of holes located on the swirler and the swirler cap to control the rate of flow as well as the pressure of the fluid entering the activation chamber. For example, a single small hole in the swirler and swirler cap combination will result in a fluid stream entering the activation chamber at very high pressure. This will cause rapid erosion of the chemical capsule.

A final method of chemical concentration control is through manipulation of the venturi plate. Two avenues can be taken. The size, number, configuration, and shape of the holes located in the venturi plate illustrated in FIG. 5C can be changed in order to control the rate of flow of fluid out of the activation chamber. Decreasing the rate of fluid flow will cause a decrease in concentration levels, while increasing the rate of flow will have an opposite effect.

Alternatively, the cam system of venturi plate illustrated in FIGS. 5B and 8 can be employed. The cam is positioned to expose the particular hole or holes desired to correspond with the rate of fluid flow out of the activation chamber desired.

In order to change the cam position, the upper body member is detached from the cylindrical receiving member of the lower body. The swirler is detached from the hydro-injector body. The cam, being impaled on the hydro-injector body, is free to rotate into the desired position. Thereafter, the swirler and the upper body member are each replaced, with the swirler holding the cam in the desired position.

The various methods of chemical concentration control can be utilized in combination in order to receive the chemical concentration desired.

The dispenser assembly can be fabricated as a unibody or component design. The components of the dispenser assembly (upper body member, lower body member, and hydro-injector venturi system) can be fabricated from any durable material, such as, but not limited to: polymer (i.e. polyvinyl chloride) or polymer coated metal.

While the invention has been particularly shown and described with reference to embodiments thereof, it will be understood by those skilled in the art that various changes in form and detail may be made without departing from the spirit and scope of the invention.

I claim:

1. A dispenser assembly for controlled hydro-injection/venturi release of an erodible solid into a liquid comprising:
   a lower body member;
      said lower body member includes an inlet and an outlet;
         said inlet includes an attachment means for attaching a pressurized fluid line to said inlet to allow fluid to flow into said lower body member;
      a hydro chamber;
      said hydro chamber is located in said lower body member;
   upper body member;
      said upper body member is attached to said lower body member;
      said upper body member houses said erodible solid;
   a first means for directing and controlling pressure rate, erosion of said erodible solid, concentration of said dissolved material and flow patterns of said fluid when entering and exiting said upper body member in order to dissolve said erodible solid and transport said dissolve material into said lower body member into a fluid stream and to said outlet;
   a second means for directing, alternating, and controlling pressure rate and flow patterns of said fluid from said inlet to said outlet in said lower chamber and said second means also aids in directing alternating and controlling pressure rate of said fluid to said upper body member from said lower body member; and
   said first means is located between said upper body member and said lower body member and said second means is located within said hydro chamber of said lower body member and extends through said first means and into said upper body member.

2. A dispenser assembly as in claim 1 wherein said first means for directing and controlling pressure rate, erosion of said erodible solid, concentration of said dissolved material and flow patterns of said fluid to enter and exit said upper body member to said lower body member further includes are adjustable control system for directing pressure and flow patterns of said dissolved material from said upper body member to said lower body member.

3. A dispenser assembly as in claim 2 wherein said adjustable control system includes a venturi plate;
   said venturi plate has an area;
   said venturi plate has a top surface and a bottom surface;
      said top surface faces said upper body member and said bottom surface faces said lower body member;
   said venturi plate includes left side and a right side;
   a set of holes is provided on said left side and extends through said top surface to said bottom surface;
   at least one opening is provided on said right side and extends through said top surface to said bottom surface;
   a means for covering or exposing said set of holes or said opening.

4. A dispenser assembly as in claim 3 wherein said means for covering or exposing said set of holes or said opening includes a cam; and
   said cam can freely rotate and move on said venturi plate.

5. A dispenser assembly as in claim 4 wherein said second means includes a body and a swifter;
   said body being a hollow cylinder having an L-shape;
   said body has an open first end and a second end;
      said open first end faces said inlet of said lower body member;
      said venturi plate is attached to said second end of said body;
      said swirler is attached to said second end of said body;
      said swirler is located within said upper body member and maintains said erodible solid in position; and
   wherein said fluid enters said inlet and flows into and around said open first end of said body, said fluid entering said body is then routed into said swirler, from said swirler said fluid directionally enters said upper body member and contacts said erodible solid which causes said erodible solid to controllably dissolve into said fluid to form said solution, said solution then exits said upper body member through said adjustable control system venturi plate and into said fluid stream in said lower body member exiting said dispenser assembly through said outlet.

6. A dispenser assembly as in claim 5 wherein said second means further includes a tube;

said tube has a first end portion and a second end portion;

said first end portion is open;

said second end portion is attached to said open first end of said body; and wherein said fluid enters said inlet and flows into and around said first end of said tube, said fluid entering said tube is then routed into said body, then said fluid is routed into said swirler, from said swirler said fluid enters said upper body member and contacts said erodible solid which causes said erodible solid to dissolve into said fluid to form said solution, said solution then exits said upper body member through said venturi plate and into said fluid stream in said lower body member existing said dispenser assembly through said outlet.

7. A dispenser assembly as in claim 1 wherein said first means includes a venturi plate and said second means further includes a body and a swirler;

said body being a hollow cylinder having an L-shape;

said body has a top end and a bottom end;

said swirler has an upper end and a lower end;

said lower end of said swirler is attached to said top end of said body;

said body and said swirler are aligned along a vertical axis of said dispenser assembly;

said venturi plate is perpendicularly resting on said top end of said body;

said body, said swirler, and said venturi plate each include a plurality of holes;

said body, said swirler, and said venturi plate form a hydro-injection/venturi system; and wherein said fluid enters said inlet and flows into and around said plurality of holes in said body, said entering said body is routed into said swirler, from said swirler said fluid enters said upper body member and directionally contacts said erodible solid which causes said erodible solid to dissolve into said fluid to form said solution, said solution then exits said upper body member through said plurality of holes in said venturi plate and into said fluid stream in said lower body member exiting said dispenser assembly through said outlet.

8. A dispenser assembly as in claim 1 wherein said first means includes a venturi plate and said second means further includes a body and a swirler;

said body being a hollow cylinder having an L-shape;

said body has an open first end and a second end;

said open first end faces said inlet of said lower body member;

said venturi plate is resting on said second end of said body;

said swirler is attached to said second end of said body;

said venturi plate has an outer periphery, a top surface, and a bottom surface;

said outer periphery communicates with said upper body member;

said bottom surface faces said lower body member;

said swirler is located in said upper body member and maintains said erodible solid in position;

said swirler and said venturi plate each include a plurality of holes;

wherein said fluid enters said inlet and flows into and around said open first end of said body, said fluid entering said body is then routed into said swirler, from said swirler said fluid enters said upper body member and contacts said erodible solid which causes said erodible solid to dissolve into said fluid to form said solution, said solution then exits said upper body member through said plurality of holes in said venturi plate and into said fluid stream in said lower body member exiting said dispenser assembly through said outlet.

9. A dispenser assembly as in claim 8 wherein said second means further includes a tube;

said tube has a first end portion and a second end portion;

said first end portion is open and faces said inlet of said lower body member;

said second end portion is attached to said open first end of said body; and wherein said fluid enters said inlet and flows into and around said open first end of said tube, said fluid entering said tube is then routed into said body, then said fluid is routed into said swirler, from said swirler said fluid enters said upper body member and contacts said erodible solid which causes said erodible solid to dissolve into said fluid to form a solution, said solution then exits said upper body member through said plurality of holes in said venturi plate and into said fluid stream in said lower body member exiting said dispenser assembly through said outlet.

10. A dispenser assembly as in claim 9 wherein said lower end portion of said body includes a regulating hole; and wherein said regulating hole regulates as pressure said fluid flows into said upper body member, by creating a rapid escape path of said fluid directly to said outlet, thereby creating a low pressure area Within a bottom half of said lower body member and causing a venturi induced affect and drawing said fluid from said upper body member by-way-of said plurality of holes in said venturi plate directly into said lower body member producing a vortex reaction, and said swirler produces a swirling action to combine said solution from said upper body member with said fluid flowing around said first end portion of said tube, where both are expelled through said outlet by a direct flow of said fluid through said regulating hole.

11. A dispenser assembly as in claim 1 wherein said upper body member further includes a top and a bottom;

said bottom is attached to said lower body member and said top includes a cap; and said cap is attachable to and detachable from said top of said upper body member.

12. A dispenser assembly as in claim 4 wherein said upper body member is attachable to and detachable from said lower body member for permitting an adjustment of said cam on said venturi plate.

13. A dispenser assembly as in claim 11 wherein said cap includes an enclosed top and an encompassing side wall;
- said enclosed top includes a first exterior and a first interior;
    - said first interior communicates with said upper body member when said cap is attached to said upper body member;
- a first O-ring is located in said first interior of said cap; and
    - said first O-ring provides a sealing means when said dispenser assembly is being utilized.

14. A dispenser assembly as in claim 13 wherein said lower body member includes a top surface and a bottom surface;
- said top surface includes cylindrical receiving member;
    - said cylindrical receiving member extends outwardly from said top surface of said lower body member; and
    - said cylindrical receiving member receives and maintains said upper body member.

15. A dispenser assembly as in claim 11 wherein said cylindrical receiving member includes a second interior and a second exterior;
- a second O-ring is located in said second interior of said cylindrical receiving member;
    - said second O-ring communicates with said upper surface and said upper body member when said upper body member is attached to said lower body member; and
    - said second o-ring provides a sealing means when said dispenser assembly is being utilized.

16. A dispenser assembly as in claim 2 wherein said adjustable control system is a venturi plate and said second means includes a body and a swirler;
- said body being a hollow cylinder having an L-shape;
- said L-shape has a first portion and a second portion;
    - said first portion is perpendicular to said second portion;
- said body has a top end and a bottom end;
- said swirler has an upper end and a lower end;
- remotably said lower end of said swirler is adapted to be secured to said top end of said body;
- said first portion of said body and said swirler are aligned along a vertical axis of said dispenser assembly;
- said venturi plate is perpendicularly attached to said top end of said body;
- said body, said swirler, and said venturi plate each include a plurality of holes;
- a hydro-injector tube is adapted to be removably secured to said second portion of said body;
- said upper body member is adapted to be removably secured to said lower body member for enabling attaching and detaching of said hydro-injector tube; and
- wherein said fluid enters said inlet and flows into and around said plurality of holes in said body, said fluid entering said body is routed into said swirler, from said swifter said fluid enters said upper body member and directionally contacts said erodible solid to dissolve into said fluid to form said solution, said solution then exits said upper body member through said plurality of holes in said venturi plate and into said fluid stream in said lower body member exiting said dispenser assembly through said outlet.

17. A dispenser assembly as in claim 16 wherein said venturi plate further includes a top surface and a bottom surface;
- said top surface faces said upper body member and said bottom surface faces said lower body member;
- said venturi plate includes a first side and a second side;
- a first set of holes is provided on said first side and extends through said top surface to said bottom surface;
- at least one opening is provided on said second side and extends through said top surface to said bottom surface; and
- a third means for covering or exposing said set of holes or said opening.

18. A dispenser assembly as in claim 17 wherein said means for covering or exposing said set of holes or said opening includes a cam; and
- said cam can freely rotate and move on said venturi plate.

* * * * *